(12) United States Patent  (10) Patent No.: US 9,375,815 B2
Faus et al.  (45) Date of Patent: Jun. 28, 2016

(54) TENSION DEVICE FOR PRESTRESSING AN ASSEMBLY BY MEANS OF A THREADED ROD, AND METHOD FOR ASSEMBLING THE TENSION DEVICE

(71) Applicant: Aktiebolaget SKF, Göteborg (SE)

(72) Inventors: Jose Faus, Levallois-Perret (FR); Didier Declerck, Acheres (FR)

(73) Assignee: AKTIEBOLAGET SKF, Gothenburg (SE)

( * ) Notice: Subject to any disclaimer, the term of this patent is extended or adjusted under 35 U.S.C. 154(b) by 514 days.

(21) Appl. No.: 13/950,871

(22) Filed: Jul. 25, 2013

(65) Prior Publication Data

US 2014/0060255 A1  Mar. 6, 2014

(30) Foreign Application Priority Data

Jul. 25, 2012 (FR) .................................. 1000158137

(51) Int. Cl.
*B25B 29/02* (2006.01)
*B23P 19/06* (2006.01)

(52) U.S. Cl.
CPC ............... *B23P 19/067* (2013.01); *B25B 29/02* (2013.01); *Y10T 29/49826* (2015.01)

(58) Field of Classification Search
CPC ............................ B25B 29/02; B23P 19/067
USPC ........................................ 18/57.38; 254/29 A
See application file for complete search history.

(56) References Cited

U.S. PATENT DOCUMENTS

| 4,438,901 | A | * | 3/1984 | Reneau | .................... | B25B 29/02 |
| | | | | | | 254/29 A |
| 5,803,436 | A | * | 9/1998 | Hohmann | ............... | B25B 29/02 |
| | | | | | | 254/29 A |
| 6,065,737 | A | * | 5/2000 | Richardson | ............. | B25B 29/02 |
| | | | | | | 254/29 A |
| 2009/0293418 | A1 | | 12/2009 | Britton et al. | | |
| 2011/0192257 | A1 | | 8/2011 | Armstrong | | |

FOREIGN PATENT DOCUMENTS

| DE | 102007015975 A1 | 10/2008 |
| EP | 0922527 A1 | 2/1999 |
| GB | 2193549 A | 2/1988 |

* cited by examiner

*Primary Examiner* — Bryan R Muller
(74) *Attorney, Agent, or Firm* — Bryan Peckjian; SKF USA Inc. Patent Dept.

(57) ABSTRACT

Device for tensioning a threaded rod comprising an actuator able to exert an axial tensile force on the threaded rod with respect to a structure to be tensioned, the said tension device comprising a cylinder, a piston, a tubular skirt in contact with the cylinder and a surface of the said structure to be tensioned, and a tie for transmitting the axial tensile force of the actuator towards an end of the threaded rod. The tie and the tubular skirt each comprise at least two semicylindrical parts each having two substantially planar axial surfaces, the two axial surfaces of one semicylindrical part being joined radially respectively with one of the two axial surfaces of the other semicylindrical part, so as to form a part of revolution.

13 Claims, 12 Drawing Sheets

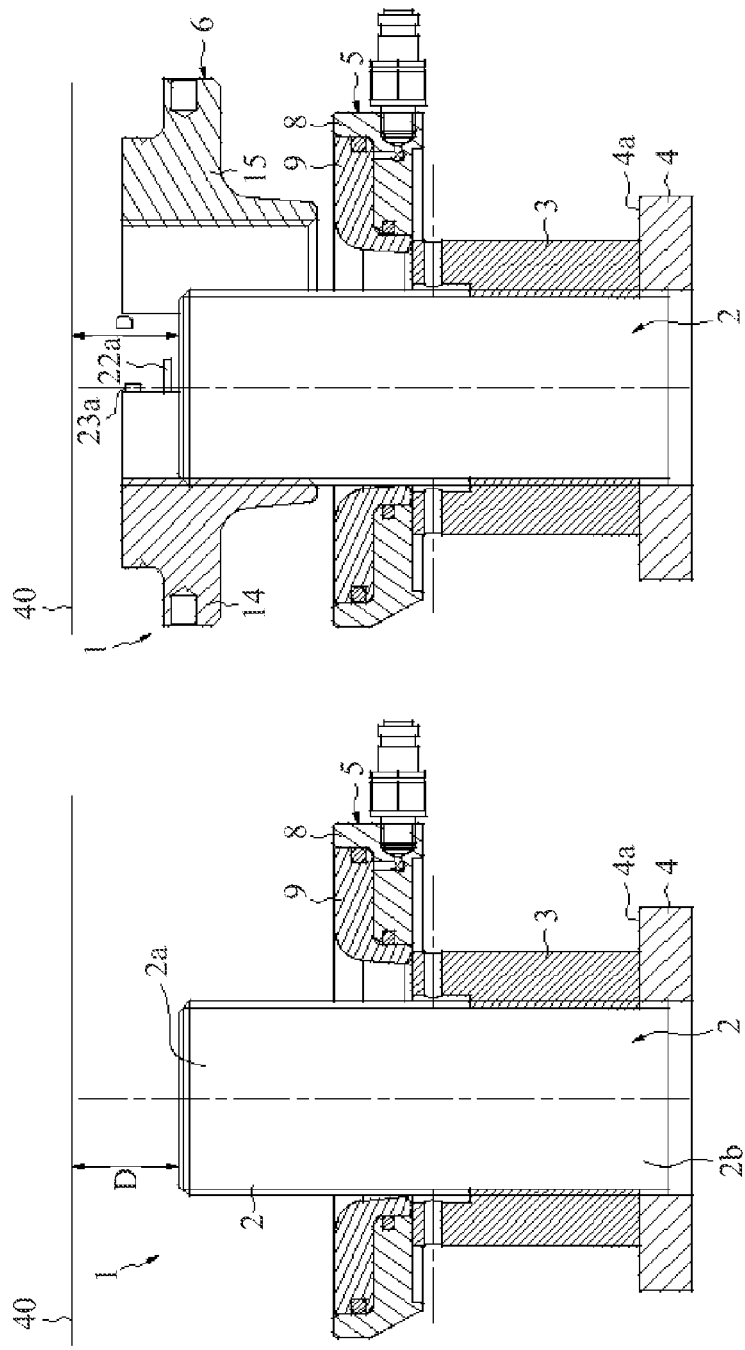

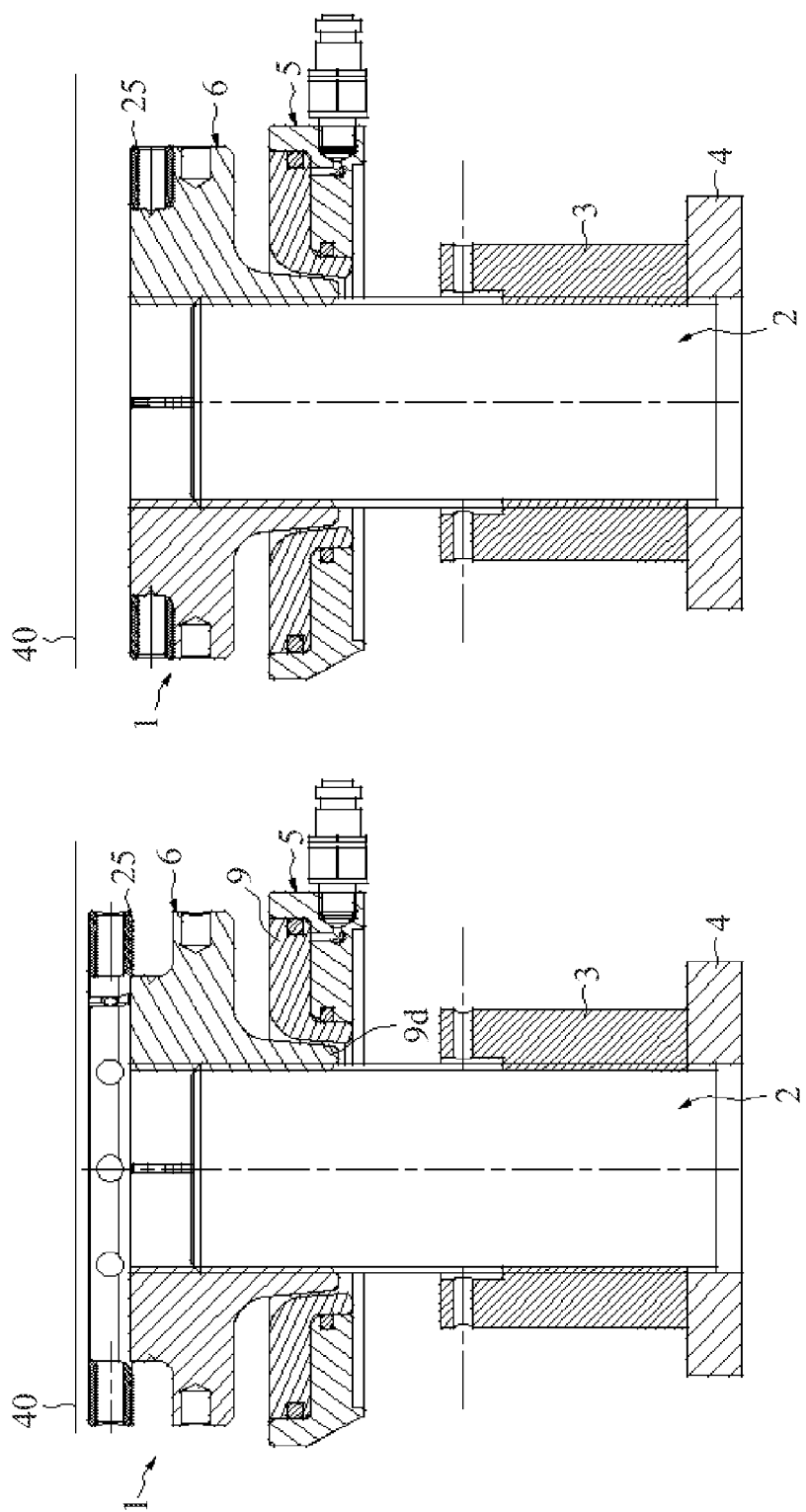

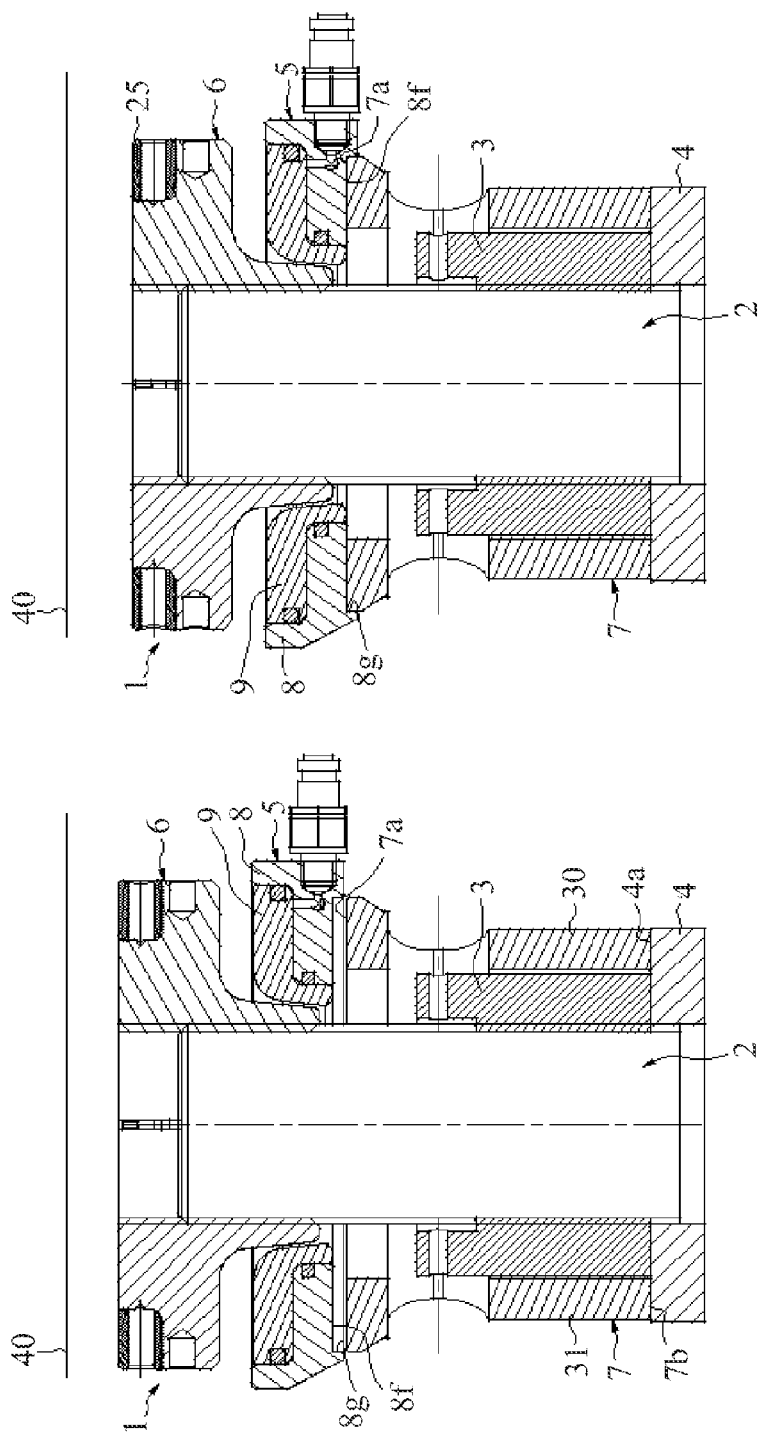

TENSION DEVICE FOR PRESTRESSING AN ASSEMBLY BY MEANS OF A THREADED ROD, AND METHOD FOR ASSEMBLING THE TENSION DEVICE

CROSS-REFERENCE TO RELATED APPLICATION

This application is a U.S. Non-Provisional Utility Patent Application claiming the benefit of French Patent Application Number 1000158137 filed on 25 Jul. 2012, which is incorporated herein in its entirety.

TECHNICAL FIELD

The present invention relates to the field of devices for tensioning a rod before it is locked in position, for example by means of a nut, the invention relating in particular to devices for prestressing the threaded rods used for fixing mechanical parts to one another in the nuclear sector, the building sector, or alternatively the wind energy sector.

BACKGROUND ART

Tension devices generally comprise an actuator able to exert an axial traction force on one end of a threaded rod by way of a tie. The actuator bears on a surface of a structure to be clamped via a tubular skirt surrounding one end of the threaded rod, opposite the end subjected to the axial force of the actuator. The actuator comprises a cylinder and a piston sliding in the cylinder and forming with the cylinder an annular chamber supplied with fluid under pressure.

Such a tension device is assembled axially and generally has a large axial space requirement, such that it is not possible to use such a tension device in the event of a small space requirement between the threaded rod to be prestressed, the mechanical parts to be assembled and the outside environment.

There is therefore a need to provide a device for tensioning a threaded rod which can be mounted on the threaded rod in the case of a very small space requirement.

It is therefore the aim of the present invention to overcome these disadvantages.

DISCLOSURE OF INVENTION

The present invention describes a device for tensioning a threaded rod which can be mounted on the threaded rod in the case of a very small space requirement, for example of about 32 mm for a threaded rod having a diameter of 76 mm, while maintaining a large residual prestressed load, of the order of 2000 kN.

The subject of the invention is a device for tensioning a threaded rod comprising an actuator able to exert an axial tensile force on the threaded rod with respect to a structure to be clamped, the said tension device comprising a cylinder, a piston and a tubular skirt in contact with the cylinder and a surface of the said structure to be tensioned, and a tie for transmitting the axial tensile force of the actuator towards an end of the threaded rod.

The tie and the tubular skirt each comprise at least two semicylindrical parts each having two substantially planar axial surfaces, the two axial surfaces of one semicylindrical part being joined radially respectively with one of the two axial surfaces of the other semicylindrical part, so as to form a part of revolution.

The tie and the tubular skirt are mounted radially around the threaded rod to be tensioned, thus allowing the assembly of the tension device even in the case of a very small space requirement.

Advantageously, the tubular skirt comprises means for spacing and means for fixing the two semicylindrical skirt parts.

According to one embodiment, the means for spacing the two skirt parts comprise spacing screws screwed into each of the planar axial surfaces of one of the skirt parts and intended to come into planar contact with the planar axial surfaces of the other skirt part.

The means for fixing the two skirt parts comprise, for example, means made of magnetized material fixed on each of the planar axial surfaces of one of the skirt parts and intended to come into planar contact with the planar axial surfaces of the other skirt part.

The means made of magnetized material may comprise magnetized washers intended to be housed in a counterbore made in each of the planar axial surfaces of one of the skirt parts and fixed on the said skirt part using fixing means, such as, for example, fixing screws.

According to another embodiment, the tie comprises means for aligning and means for fixing the two semicylindrical tie parts.

Advantageously, the means for aligning two tie parts comprise pins arranged in holes of corresponding shape made in each of the tie parts perpendicularly to the junction surfaces and spacing screws screwed into each of the planar axial surfaces of one of the tie parts and intended to come into planar contact with the planar axial surfaces of the other tie part.

The means for fixing the two tie parts may comprise a fixing ring surrounding the tie and intended to be secured onto the tie using securing means.

The fixing ring is, for example, maintained in position around the tie by cylindrical pins intended to be housed in a counterbore made in each of the junction surfaces of the two tie parts.

According to a second aspect, the invention relates to a method for assembling a tension device as described above, in which the cylinder and the piston are mounted axially on the threaded rod to be prestressed, the two semicylindrical tie parts are assembled radially around the threaded rod and the two semicylindrical parts of the skirt are assembled radially around the threaded rod.

Thus, the radial assembly of the tie and of the tubular skirt around the threaded rod makes it possible to significantly reduce the axial dimension along the axis Y-Y of the tension device.

Advantageously, the fixing ring is secured onto the tie.

Once the two skirt parts are assembled around the threaded rod, the assembly formed by the cylinder and the piston, the two semicylindrical tie parts and the fixing ring can be slid axially by screwing the tie towards the surface of the structure to be clamped and the actuator comes into axial contact against the tubular skirt.

BRIEF DESCRIPTION OF DRAWINGS

The present invention will be better understood from reading the description of some embodiments, given by way of non-limiting examples and illustrated in the appended drawings:

FIGS. 10 to 16 represent the method for assembling the tension device according to the invention.

DETAILED DESCRIPTION

Figure 1:
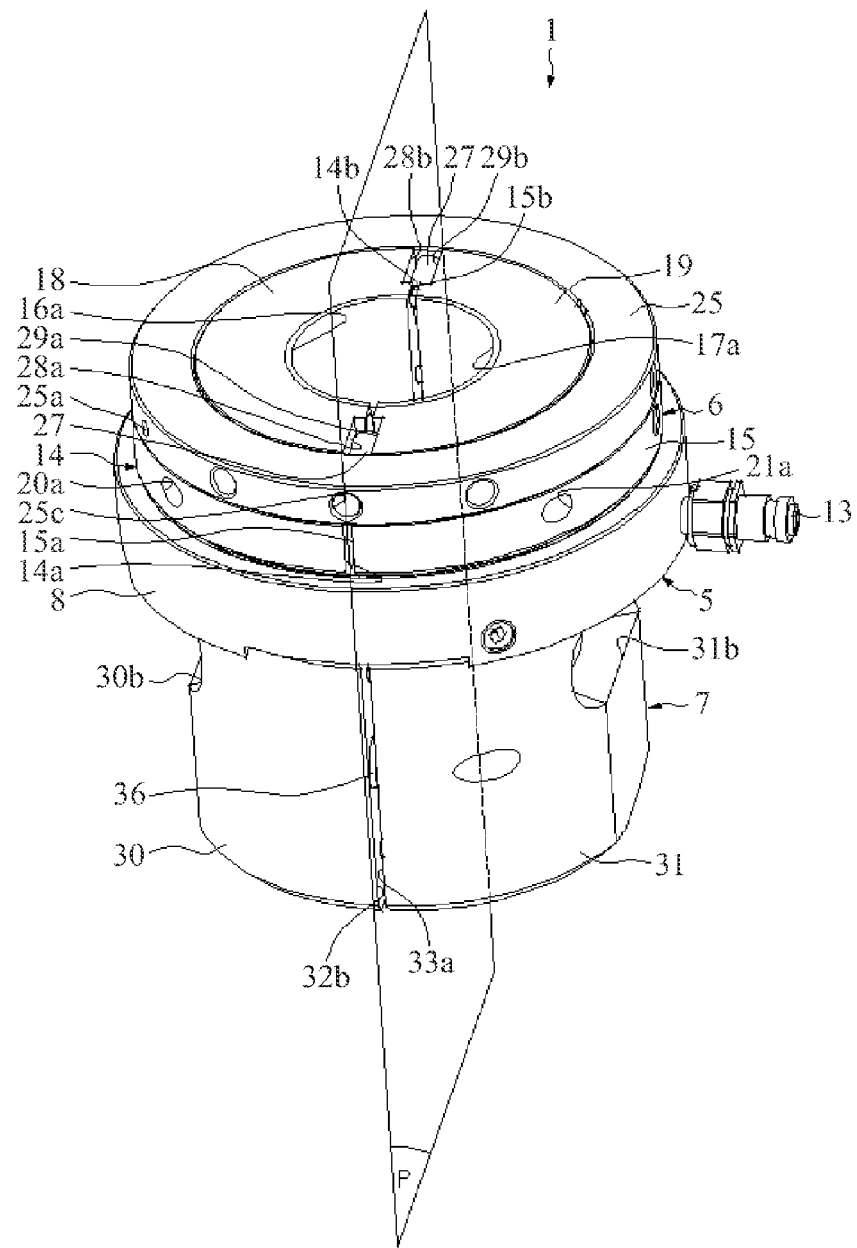
FIG. 1 is a perspective view of a tension device according to the invention.
Figure 2:
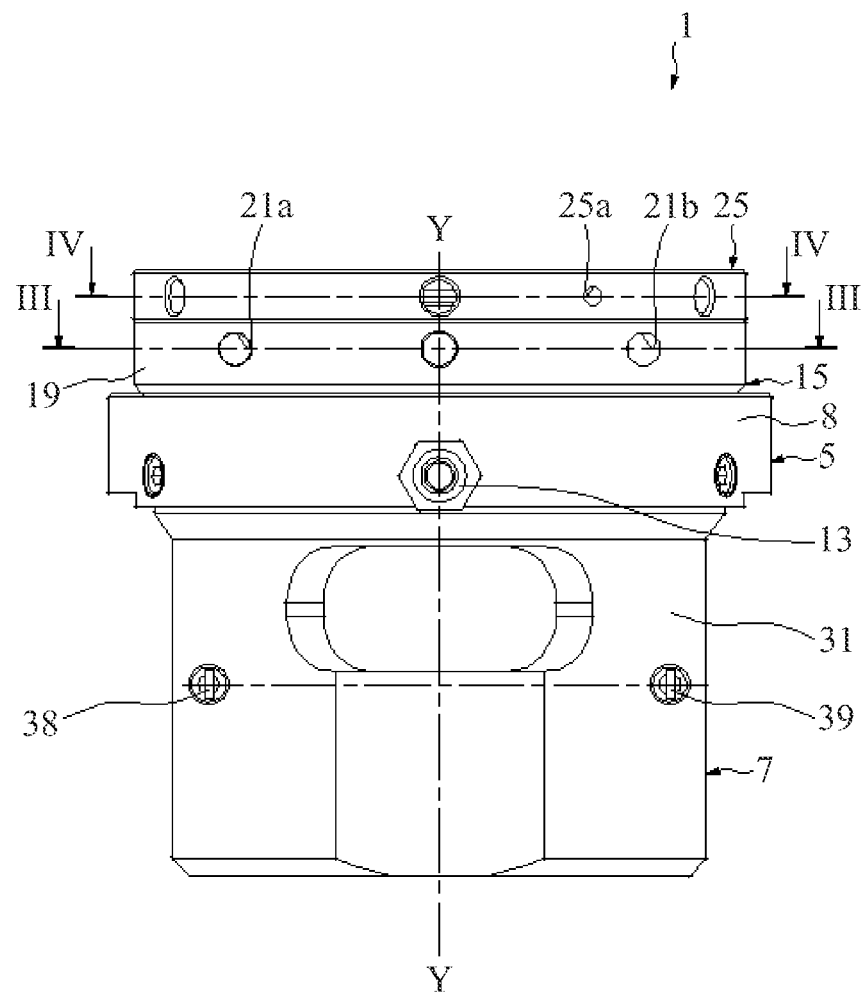
FIG. 2 is a side view of the tension device according to FIG. 1.

As illustrated in the figures, the tension device, of axial axis Y-Y, referenced 1 in its entirety, is intended to axially prestress a threaded rod 2 represented in FIGS. 10 to 16. The threaded rod 2 is then blocked in position by a nut 3 bearing on a surface 4a of a structure 4 to be clamped, generally comprising at least two mechanical parts to be assembled, and represented in the form of a plate in FIGS. 10 to 16.

The tension device 1 comprises an actuator 5, a tie 6 and a tubular skirt 7. The actuator 5 is able to exert an axial traction force on an end 2a of the threaded rod 2 via the tie 6. The actuator 5 bears on the surface 4a of the structure 4 to be clamped via the tubular skirt 7 surrounding an end 2b of the threaded rod 2, opposite the end 2a subjected to the axial force of the actuator 5. The actuator 5 comprises a cylinder 8 and a piston 9 sliding in the cylinder 8 and forming with the cylinder 8 an annular chamber (not shown) supplied with fluid under pressure. The cylinder 8 has the general shape of an annular cup comprising an axial portion 8a having a bore 8b and a base 8c in the form of a radial portion extending inwardly from an end of the axial portion 8a and having a bore 8d. The radial portion 8c forms a radial shoulder 8c for the piston 9. On the opposite side to the shoulder 8e, the base 8c comprises a radial bearing surface 8f in contact with an end 7a of the tubular skirt 7 opposite the end 7b in contact with the surface 4a of the structure 4 to be tensioned. The base 8c of the cylinder 8 comprises an axial shoulder 8g extending towards the structure 4 to be tensioned and surrounding the end 7a of the tubular skirt 7 in order to centre the cylinder 8 on the tubular skirt 7 and to maintain the tubular skirt 7 radially with respect to the cylinder 8.

The piston 9 has an annular general shape comprising an axial tubular portion 9a and an annular collar 9b extending radially outwards from an end of the axial tubular portion 9a. The axial tubular portion 9a has a bore 9c of substantially frustoconical shape and an outer surface 9d of substantially cylindrical shape in contact with the bore 8d of the base 8c of the cylinder 8. The annular collar 9b comprises an outer axial surface 9e in contact with the bore 8b of the axial portion 8a of the cylinder 8. The annular chamber (not shown) is formed axially between the annular collar 9b of the piston 9 and the radial base 8c of the cylinder 8, and radially between the axial portion 8a of the cylinder 8 and the tubular portion 9a of the piston 9. The radial base 8c of the cylinder 8 comprises an annular groove 8h formed on its bore 8d and in which there is arranged a seal 10 in frictional contact with the outer surface 9d of the tubular portion 9a of the piston 9. Analogously, the annular collar 9b of the piston 9 comprises an annular groove 9f formed on its outer surface 9e and in which there is arranged a seal 11 in frictional contact with the bore 8b of the axial portion 8a of the cylinder 8. The seals 10 and 11 serve to seal the annular chamber.

The actuator 5 comprises means for supplying pressurized fluid which are partly represented in the figures. An inlet 12 is formed in the base 8c of the cylinder 8, opening on one side into the annular chamber at the radial surface 8c, and at the opposite side towards the outside. A hydraulic connection 13 is fixed to the outside of the cylinder 8 in order to supply the inlet 11 with pressurized fluid.

The tie 6 comprises two substantially identical tie parts 14, 15. In a variant, it would be possible to provide another number of tie parts greater than two. Each tie part 14, 15 takes the form of an angular portion of a part of revolution delimited by radial planes, the said part of revolution comprising a tubular portion 16, 17 having a bore 16a, 17a provided with a tapping (not shown) and a substantially frustoconical outer surface 16b, 17b in contact with the bore 9c of the piston 9, and a radial portion 18, 19 having a lower radial shoulder 18a, 19a in axial contact with the annular collar 9b of the piston 9 and an upper radial shoulder 18b, 19b.

As illustrated, the tie 6 comprises two substantially semi-cylindrical tie parts 14, 15, that is to say each occupying an angular sector substantially equal to 180°. The tie parts 14, 15 are situated on either side of a radial parting plane P.

The first tie part 14 comprises two substantially planar axial junction surfaces 14a, 14b joined radially respectively with a substantially planar axial junction surface 15a, 15b of the second tie part 15, so as to form a part of revolution of 360°.

Figure 3:
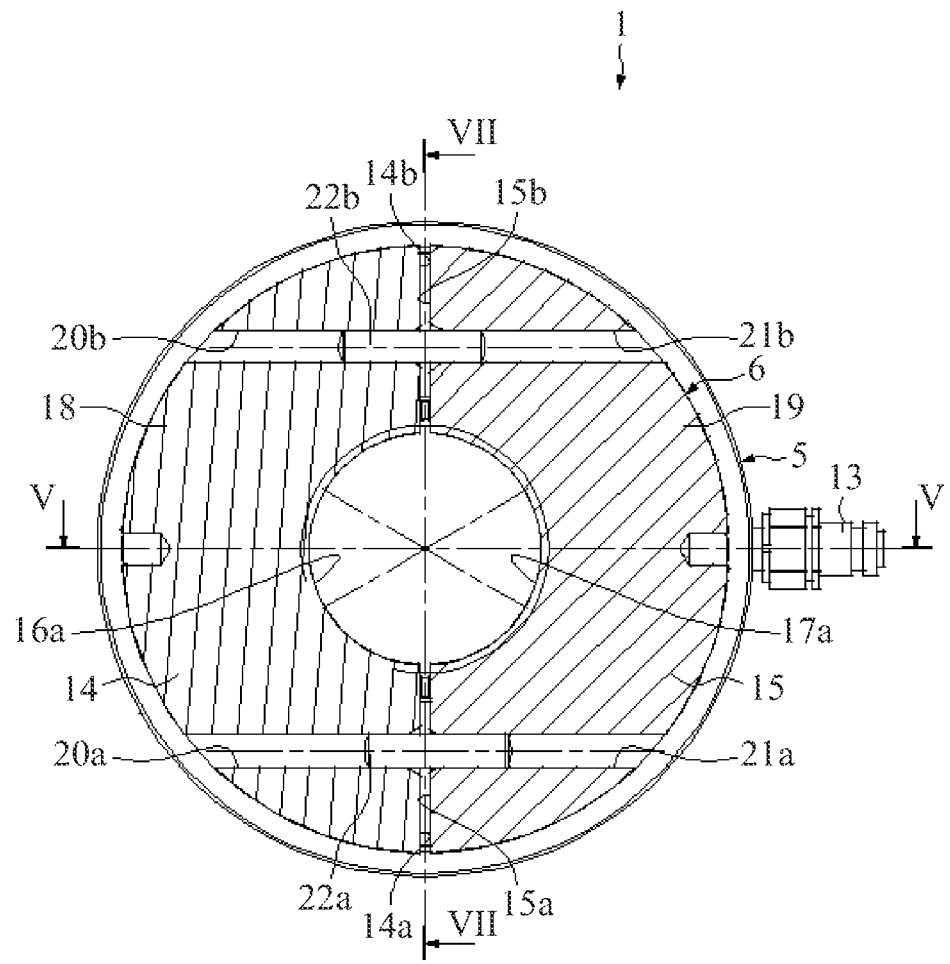
FIG. 3 is a view in radial section of the tension device according to FIG. 2.
Figure 4:
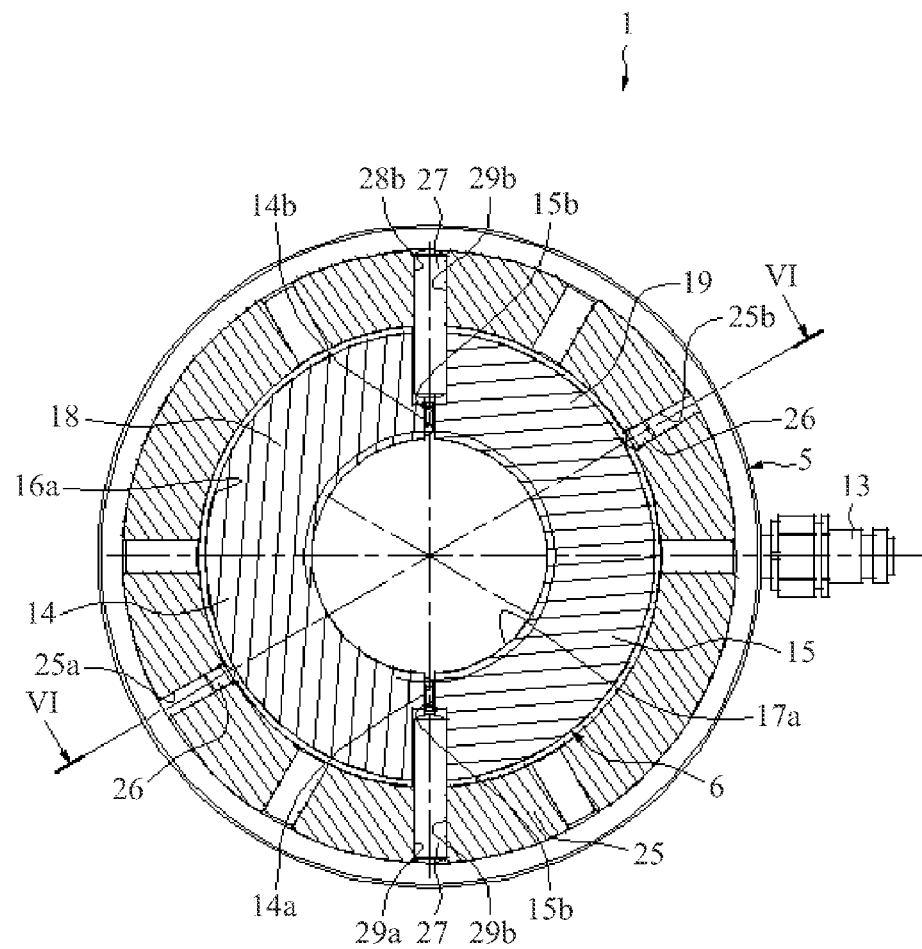
FIG. 4 is a view in radial section IV-IV of the tension device according to FIG. 2.
Figure 5:
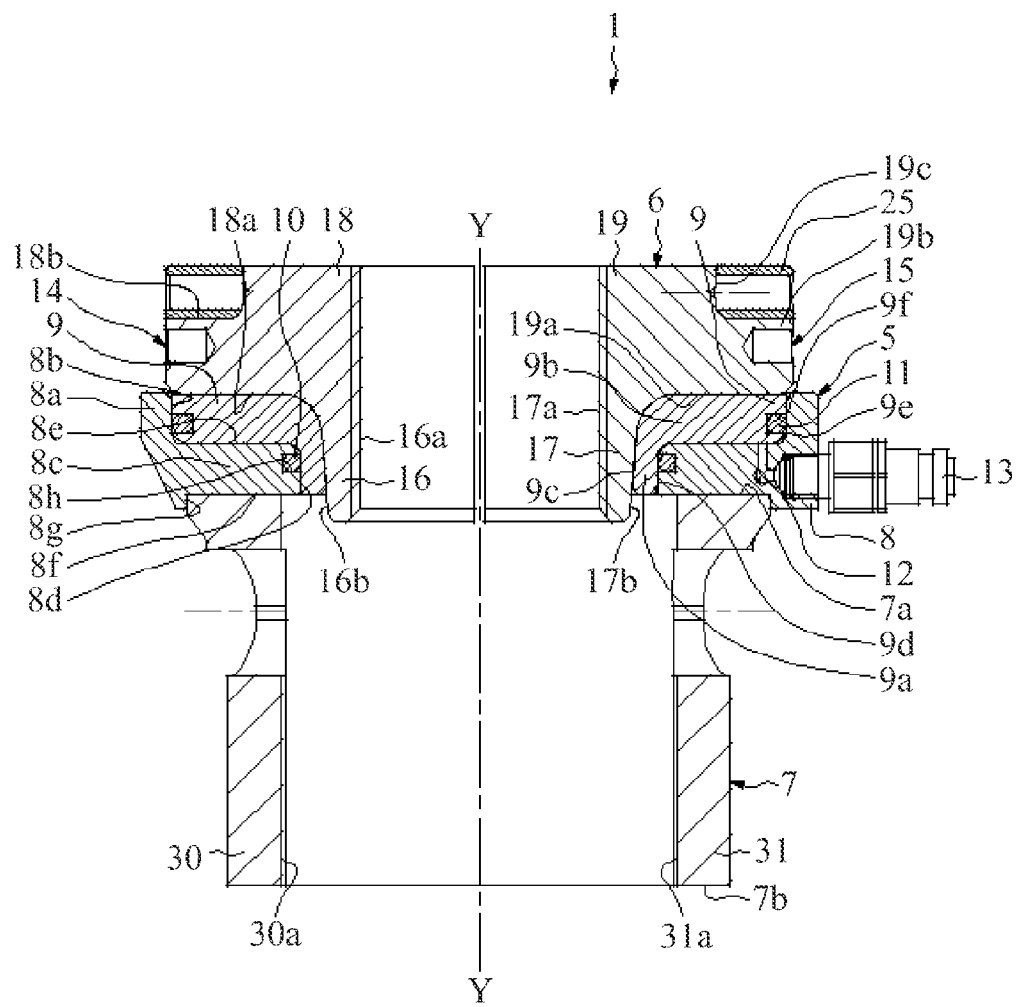
FIG. 5 is a view in axial section V-V of the tension device according to FIG. 3.
Figure 6:
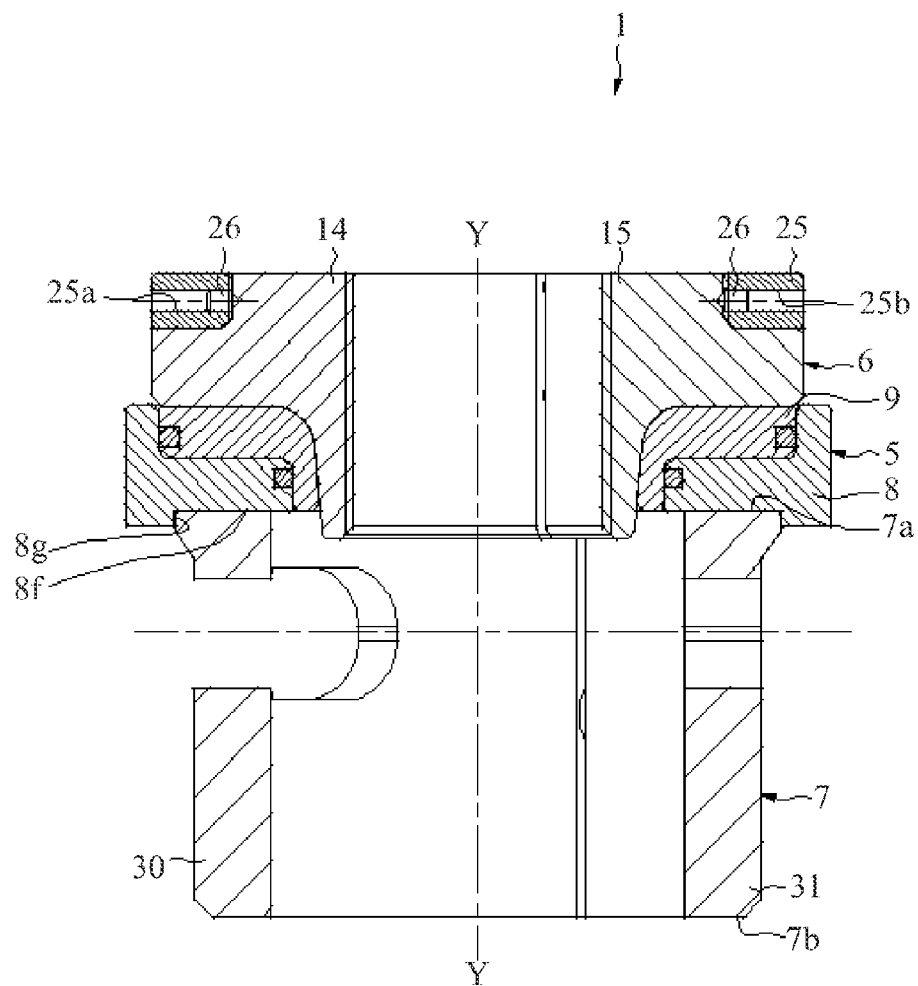
FIG. 6 is a view in axial section VI-VI of the tension device according to FIG. 4.
Figure 7:
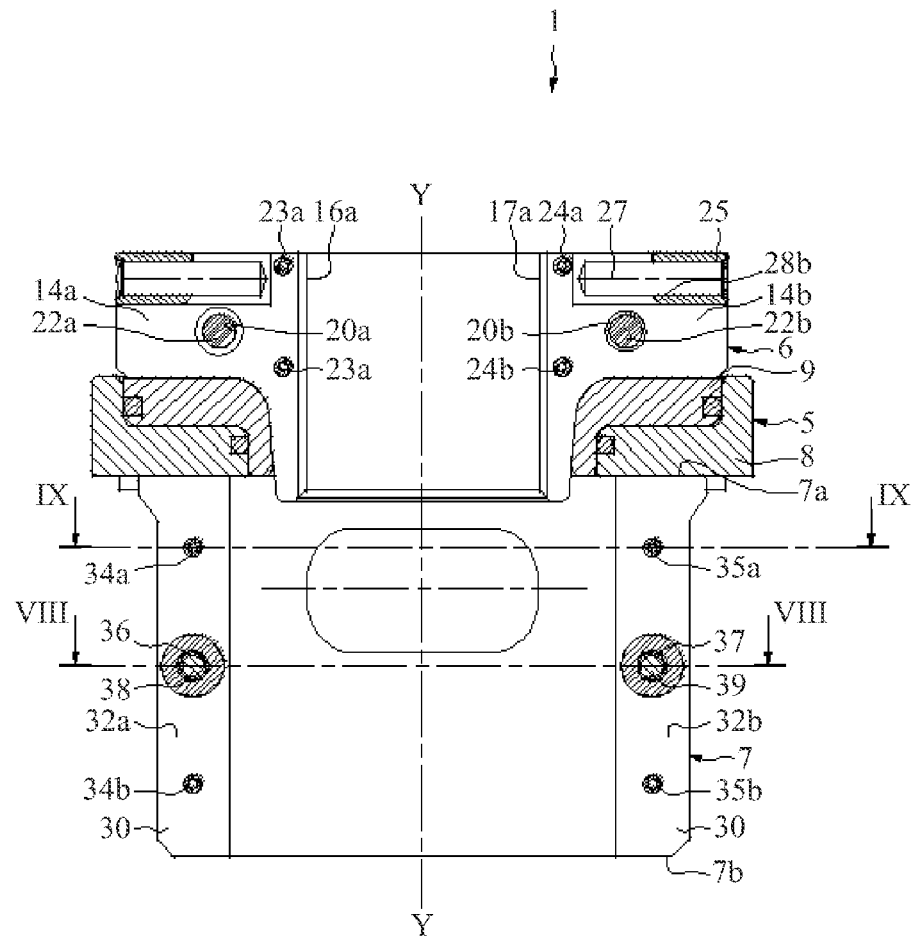
FIG. 7 is a view in axial section VII-VII of the tension device according to FIG. 3.

As illustrated in detail in FIGS. 3 and 7, each of the radial portions 18 and 19 is provided with two holes 20a, 20b and 21a, 21b parallel to the parting direction of the two tie parts 14, 15, perpendicularly to the junction surfaces 14a, 14b, 15a, 15b, and made in the thickness of the radial portions 18, 19. A hole 20a of one of the tie parts 14 comes opposite a hole 21a of the other tie part 15. Guide means 22a, 22b, in the form of studs, pegs or pins, are respectively mounted slideably in the holes 20a, 21a and 20b, 21b of the corresponding tie parts 14, 15, maintaining an axial passage (not referenced) between the two tie parts 14, 15. Thus, the two tie parts 14, 15 are aligned with respect to one another so as to ensure the correspondence of the tapping made on their respective bore 16a, 17a.

Each of the radial portions 18 and 19 of the tie parts 14, 15 additionally comprises additional spacing means 23a, 23b, 24a, 24b, numbering four, illustrated in FIG. 7. The additional spacing means 23a, 23b, 24a, 24b comprise spacing screws screwed into each of the planar axial surfaces 14a, 14b of one of the tie parts 14 and intended to come into planar contact with the planar axial surfaces 15a, 15b of the other tie part 15. The pins 22a, 22b and the screws 23a, 23b, 24a, 24b form means for guiding one tie part 14 with respect to the other 15 and making it possible to position the tie parts 14, 15 easily and reliably.

The two tie parts 14, 15 are maintained in an assembled position with the aid of fixing means comprising a fixing ring 25 surrounding the tie and intended to be mounted on the upper radial shoulder 18b, 19b. The fixing ring 25 is intended to be secured onto the tie 6 using securing means 26, such as ball screws, each inserted into a hole 25a, 25b made radially in the thickness of the fixing ring 25. The ball screws 26 have, at one end, a shape, for example a pointed shape, matching the shape of a radial notch 18c, 19c made in the corresponding radial portion 18, 19. The fixing ring 25 is maintained in position around the tie 6 by cylindrical pins 27, for example numbering two, intended to be housed in a counterbore 28a, 28b, 29a, 29b made in each of the junction surfaces 14a, 14b, 15a, 15b of the two tie parts 14, 15. A radial through-hole 25c, 25d is made for this purpose in the fixing ring 25. When the fixing ring 25 is assembled on the tie 6, the diameter of the fixing ring 25 is substantially equal to the diameter of the radial portions 18 and 19.

The tie 6 is provided with additional holes (not referenced) allowing the manual screwing of the assembly consisting of the tie 6 and the fixing ring 25 by means, for example, of a pin having a diameter corresponding to the diameter of the additional holes.

The tubular skirt 7 comprises two substantially identical skirt parts 30, 31. Each tubular skirt part 30, 31 takes the form of an angular portion of a part of revolution delimited by radial planes, and having a bore 30a, 31a. The tubular skirt 7 has a first end 7a in contact with a radial bearing surface 8f of the cylinder 8 and a second end 7b, opposite the first end 7a, in contact with the surface 4a of the structure 4 to be tensioned. The end 7a of the tubular skirt 7 is centred and maintained radially by the axial shoulder 8g of the base 8c of the cylinder 8.

As illustrated, the tubular skirt 7 comprises two substantially semicylindrical skirt parts 30, 31, that is to say each occupying an angular sector substantially equal to 180°. The skirt parts 30, 31 are situated on either side of a radial parting plane P.

The first skirt part 30 comprises two substantially planar axial surfaces 32a, 32b joined radially respectively with a substantially planar axial surface 33a, 33b of the second skirt part 31, so as to form a part of revolution of 360°. The axial surfaces 32a, 32b, 33a, 33b can be seen in detail in FIGS. 8 and 9.

Figure 8:
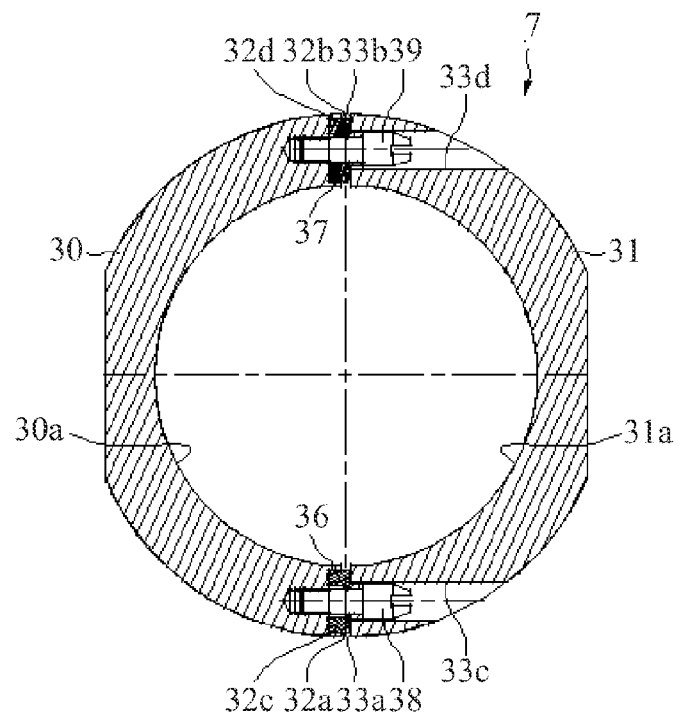
FIG. 8 is a view in radial section VIII-VIII of the tension device according to FIG. 7.
Figure 9:
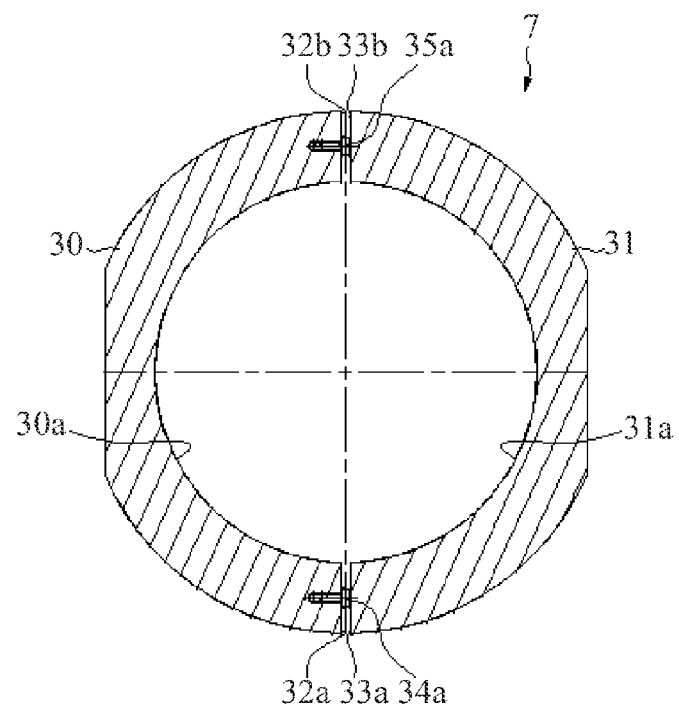
FIG. 9 is a view in radial section IX-IX of the tension device according to FIG. 7.

As illustrated in detail in FIGS. 7 to 9, the tubular skirt 7 comprises centring means 34a, 34b, 35a, 35b, numbering four, illustrated in FIGS. 7 and 9. The centring means 34a, 34b, 35a, 35b comprise centring screws screwed into each of the planar axial surfaces 30a, 30b of one of the skirt parts 30 and intended to come into planar contact with the planar axial surfaces 31a, 31b of the other skirt part 31. The shoulder 8g of the cylinder 8 and the screws 34a, 34b, 35a, 35b form means for centring one skirt part 30 with respect to the other 31 and make it possible to position the skirt parts 30, 31 easily and reliably.

The two skirt parts 30, 31 are maintained in an assembled position with the aid of fixing means comprising means made of magnetized material, such as magnetized annular washers 36, 37 illustrated in FIGS. 7 and 8, housed in a counterbore 32c, 32d made in each of the planar axial surfaces 32a, 32b of one of the skirt parts 30. The magnetized annular washers 36, 37 are fixed on the corresponding planar axial surface 32a, 32b by a fixing screw 38, 39 screwed into the skirt part 30 comprising the counterbores 32c, 32d and inserted into a hole 33c, 33d parallel to the parting direction of the two skirt parts 30, 31, perpendicularly to the junction surfaces 32a, 32b, 33a, 33b, made in the thickness of the other skirt part 31. The fixing screws 38 and 39 also serve for spacing purposes for manually placing the two skirt parts 30, 31.

The tubular skirt 7 is made of metallic material, such as, for example, of steel, so as to be attracted by the magnets 36, 37, thus forming the means for fixing the two skirt parts 30, 31 to one another.

Each skirt part 30, 31 additionally comprises an opening 30b, 31b in order to insert a tightening pin or tightening spanner (not shown) allowing the rotation of the nut 3, in order to tighten the nut 3 against the plate 4 to be clamped when the tension device 1 covers the end 2a of the threaded rod 2.

The tension device 1 is assembled as follows with reference to FIGS. 10 to 16. The tension device is assembled around the threaded rod 2 once the threaded rod 2 and the nut 3 are mounted on the structure 4 to be tensioned.

In a first step, illustrated in FIG. 10, the actuator 5 comprising the cylinder 8 and the piston 9 is mounted axially through a spacing D between the end 2a of the threaded rod 2 and a surface 40 of an external element greatly reducing the mounting space. For example, the spacing D must be at least equal to the height of the actuator 5. In the example illustrated, the spacing is equal to 32 mm.

In a second step, illustrated in FIG. 11, the two semicylindrical parts 14, 15 of the tie 6 are assembled radially around the threaded rod 2 and aligned in position via cylindrical pins 22a, 22b and spacing screws 23a, 23b, 24a, 24b (see in detail FIG. 7). Once the tie parts 14, 15 are assembled, the tie 6 is slid axially towards the actuator 5 in order to be housed in the bore 9c of the piston 9, as illustrated in FIG. 12. The fixing ring 25 is then positioned around the tie parts 14, 15 against the radial shoulder 18b, 19b of the tie parts 14, 15, in order to maintain them radially in position with respect to one another. FIG. 13 illustrates the tie 6 assembled and positioned with respect to the threaded rod 2 and to the actuator 5.

In the step illustrated in FIG. 14, the two semicylindrical parts 30, 31 of the tubular skirt 7 are assembled radially around the threaded rod 2, and in particular around the nut 3. In the step illustrated in FIG. 15, the actuator 5 is slid towards the tubular skirt 7 in order to be centred by means of the axial shoulder 8g of the base 8c of the cylinder 8. The first end 7a of the tubular skirt 7 is in contact with the radial bearing surface 8f of the cylinder 8, and the second end 7b of the skirt 7, opposite the first end 7a, is in contact with the surface 4a of the structure 4 to be tensioned.

Figure 16:
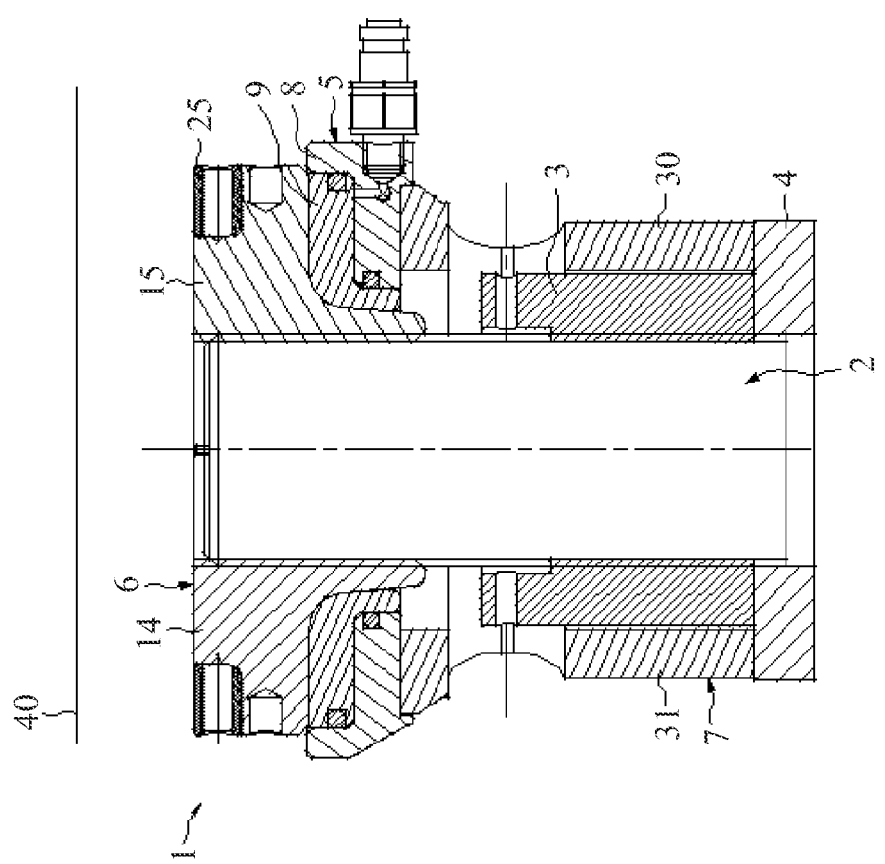

Finally, during a final step illustrated in FIG. 16, the assembly formed by the tie 6 and the fixing ring 25 is made to move helically towards the actuator 5 so as to be positioned ready to be used to tension the threaded rod 2.

By virtue of the invention described, the tension device makes it possible to prestress threaded rods even in an environment having a very small space requirement. Specifically, the radial assembly of the tie and the tubular skirt around the threaded rod makes it possible to significantly reduce the axial dimension along the axis Y-Y of the tension device.

The invention claimed is:

1. A tension device for tensioning a threaded rod, the tension device comprising:
    an actuator able to exert an axial tensile force on the threaded rod with respect to a structure to be tensioned, said actuator comprising:
    a cylinder,
    a piston,
    a tubular skirt in contact with the cylinder and
    a surface of the said structure to be tensioned, and
    a tie for transmitting the axial tensile force of the actuator towards an end of the threaded rod,
    wherein the tie and the tubular skirt each comprise at least two semicylindrical parts, each of the at least two semicylindrical parts having two substantially planar axial surfaces, wherein the two axial surfaces of one semicylindrical part is joined radially respectively with one of the two axial surfaces of the other semicylindrical part, so as to form a part of revolution.

2. The tension device according to claim 1, the tubular skirt further comprising a means for spacing the two semicylindrical skirt parts and a means for fixing the two semicylindrical skirt parts.

3. The tension device according to claim 2, wherein the means for centring the two skirt parts includes spacing screws screwed into each of the planar axial surfaces of one of the skirt parts and is intended to come into planar contact with the planar axial surfaces of the other skirt part.

4. The tension device according to claim 1, wherein the means for fixing the two skirt parts includes an element made of magnetized material fixed on each of the planar axial surfaces of one of the skirt parts and is intended to come into planar contact with the planar axial surfaces of the other skirt part.

5. The tension device according to claim 4, wherein the element made of magnetized material includes magnetized washers, the magnetized washers being housed in a counterbore made in each of the planar axial surfaces of one of the skirt parts and is fixed on the said skirt part using the fixing means.

6. The tension device according to claim 5, wherein the fixing means includes fixing screws, wherein the magnetized washers are affixed onto the planar axial surfaces of the corresponding skirt part by fixing screws.

7. The tension device according to claim 1, in which the tie comprises a means for aligning the two semicylindrical tie parts and a means for fixing the two semicylindrical tie parts.

8. The tension device according to claim 7, wherein the means for aligning two tie parts includes pins arranged in holes of a corresponding shape made in each of the tie parts, wherein the pins are perpendicular to the junction surfaces and the centring screws are screwed into each of the planar axial surfaces of one of the tie parts and are placed into planar contact with the planar axial surfaces of the other tie part.

9. The tension device according to claim 7, wherein the means for fixing the two tie parts includes a fixing ring surrounding the tie and is secured onto the tie using securing means.

10. The tension device according to claim 9, wherein the fixing ring is maintained in position around the tie by cylindrical pins housed in a counterbore made in each of the junction surfaces of the two tie parts.

11. A method for assembling a tension device comprising steps of:
obtaining the tension device, the tension device comprising:
an actuator able to exert an axial tensile force on the threaded rod with respect to a structure to be tensioned, said actuator comprising:
a cylinder,
a piston,
a tubular skirt in contact with the cylinder and
a surface of the said structure to be tensioned, and
a tie for transmitting the axial tensile force of the actuator towards an end of the threaded rod,
wherein the tie and the tubular skirt each comprise at least two semicylindrical parts, each of the at least two semicylindrical parts having two substantially planar axial surfaces, wherein the two axial surfaces of one semicylindrical part is joined radially respectively with one of the two axial surfaces of the other semicylindrical part, so as to form a part of revolution;
mounting the cylinder and the piston axially on the threaded rod to be prestressed by assembling the two semicylindrical parts of the skirt radially around the around the threaded rod.

12. The method for assembling a tension device according to claim 11, further comprising a step of clipping a fixing ring onto the tie.

13. The method for assembling a tension device according to claim 12, further comprising, following the step of assembling the two skirt parts around the threaded rod, a step of:
moving the assembly formed by the cylinder and the piston, the two semicylindrical tie parts and the fixing ring axially towards the surface of the structure to be tensioned.

* * * * *